Nov. 13, 1945.  H. S. SACKETT  2,388,870
BOAT TRAILER
Filed Aug. 23, 1944
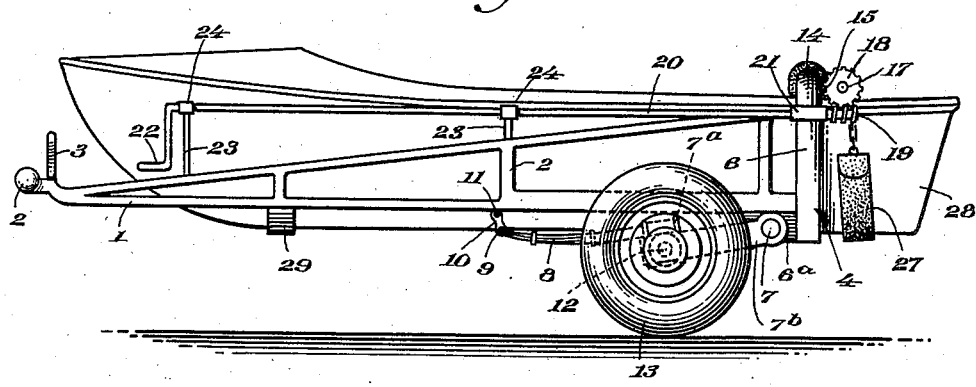
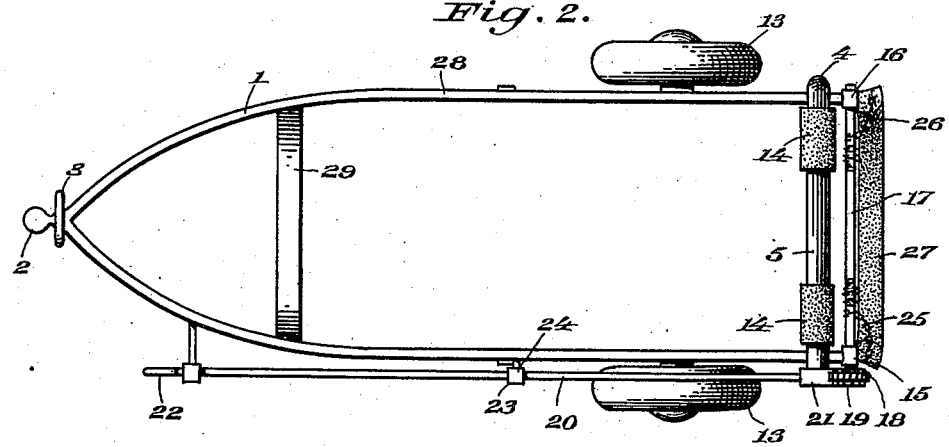
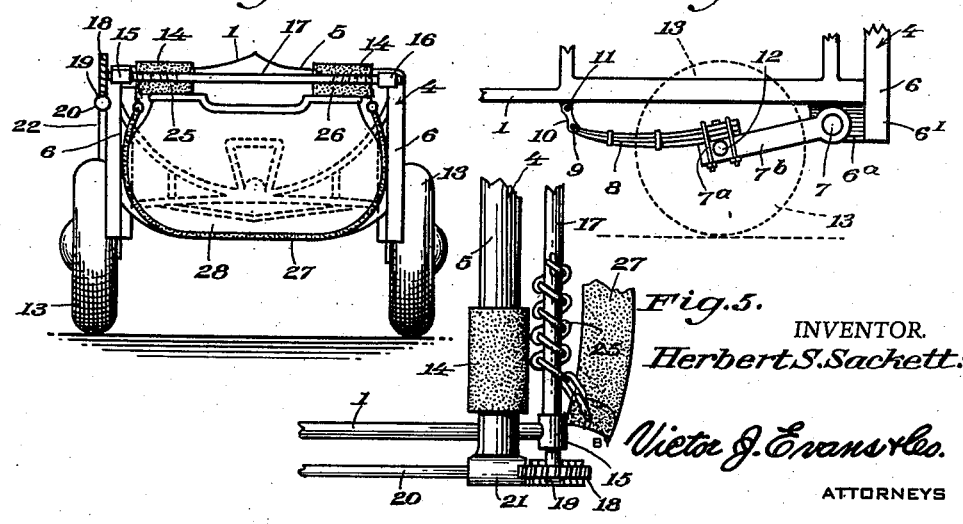
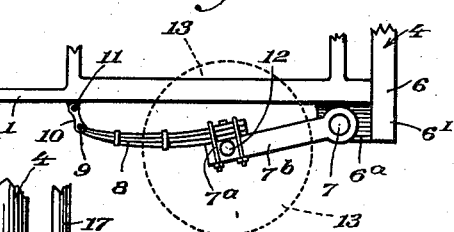
INVENTOR.
*Herbert S. Sackett*
BY *Victor J. Evans & Co.*
ATTORNEYS Patented Nov. 13, 1945

2,388,870

UNITED STATES PATENT OFFICE 2,388,870

BOAT TRAILER

Herbert S. Sackett, Windom, Minn.

Application August 23, 1944, Serial No. 550,787

4 Claims. (Cl. 214—65)

The invention relates to improvements in boat trailers.

The primary object of the invention is the provision of a trailer which can be readily backed over a boat in proper position directly above the same, so that the boat may be elevated and maintained in the trailer and supported by said elevating means for safe transportation.

Another object of the invention is to provide a trailer of this character, in which the boat may be readily raised into position, or lowered therefrom, by a single person and in which the trailer forms a cradle for supporting the boat against rocking or transverse movement during transportation.

One of the most important features of my invention is the provision of an improved supporting device for the stern of the boat wherein the hull is not only cradled, but resilient means engage the gunwales of the stern so that likelihood of dislodgment of the boat during transportation is eliminated. Furthermore, I provide improved means whereby the lifting mechanism of the stern is actuated from a point adjacent the prow by a simple crank mechanism so that the entire operation of loading and handling the boat can be carried out by one person.

A further object of the invention is to provide a trailer of this character which is light in construction, yet durable, and has the necessary springing action to obtain the easy riding of the boat during transportation.

A still further object of the invention is to provide a simple trailer which can be cheaply manufactured and easily manipulated; and, at the same time, having all the advantages of the ordinary trailer now in use.

Referring now to the drawing:

Figure 1 is a side elevation of my improved trailer, showing a boat supported therein;

Figure 2 is a top plan view of the trailer as shown in Fig. 1, but with the boat removed;

Figure 3 is a rear end view of the trailer with boat in place;

Figure 4 is a detailed elevation of one of the spring supporting devices for the rear end of the trailer; and Figure 5 is an enlarged detail view showing the means for elevating and supporting the stern of the boat, and including the gunwale cushioning device.

Referring now to the drawing, I represents the frame of the trailer, which, as shown, is made of tubular metal bars secured together in any desired manner, although it could be made of a solid form, or any other desired construction. The frame is preferably tapered towards the front end to conform to the shape of the ordinary boat transported thereby, and is formed so as to form a receiving cradle to prevent the rocking or any sidewise movement of the boat. The forward end of the frame is provided with a coupling 2, by means of which it is coupled to the bumper or any part of an automobile, as is well understood, and, therefore, needs no further description. The forward end of the frame, in rear of the coupling 2, is provided with an upwardly extending loop 3, by means of which the boat is tied down, as will be hereinafter more fully described. The rear end of the frame is open, downwardly and rearwardly, whereby the trailer is backed over the boat and straddles the same.

At the rear end of the frame is located on inverted U-shaped member 4, the horizontal bar of which extends transversely of the frame, and the depending arms 6 of which extend down at the sides as at 6. A forwardly extending extension 6ª is formed at the lower end of each of the arms 6 and pivoted, as at 7, to each of the extensions 6ª is a wheel suspension arm 7ᵇ. A clip 7ª attaches the butt of a leaf spring 8 to each of the arms 7ᵇ. The front end of each spring 8 is pivoted at 9, to a shackle 10, which in turn is pivoted at 11 to the under part of frame 1. Each arm or bar 7 carries a stub axle 12, upon which is mounted one of the wheels 13. Upon the bar portion 5 of the member 4 are mounted resilient cylindrical pads 14 and extending rearwardly from the ends of the member 4 are rigidly mounted bearings 15 and 16. Rotatably mounted in the bearings 15 and 16 is a winding shaft 17. The shaft 17 carries a pinion 18 with which is meshed a worm gear 19 carried by the crank shaft 20 which is journaled as at 21 on the frame and extends forwardly at a point adjacent the prow of the boat—as shown in Figures 1 and 2—and terminates in a crank handle 22 which is located conveniently to one handling the boat. Suitable vertical standards 23 having steady bearings 24 are provided on the top bar of the frame 1 to carry the shaft 20. Secured to the outer ends of the drum or shaft 17 are the chains 25 and 26, which have secured to their lower ends a sling 27, which is adapted to pass beneath the bottom of the boat 28, adjacent the stern thereof. The frame 1, adjacent the front end, is provided with a transverse strap or yoke 29 simulating the curvature of the bow of a boat, upon which the forward end of the boat is supported.

It will be noted that the cylindrical pads or buffers 14 are located on the transverse bar 5 of the member 4 at a point which would ordinarily register with the gunwales of a boat in the frame 1, and it will also be noted that the stub axles 12 carrying the wheels 13 are located about midway between the pivoted connection 7, of the bars 7b with the projection 6a, and the shackles 10, so that a proper spring suspension is provided for the wheels.

In operation, the bow of the boat is first preferably blocked up above the ground and the trailer is then backed over the boat to straddle the same. In the backing movement of the trailer, the transverse plate 29 will pass under the bow of the boat the latter being slightly lifted as may be necessary. The sling 27 is then placed under the stern of the boat and connected to the chains 25 and 26. The shaft 17 is thereafter rotated by the crank 22, winding the chains on the shaft and raising the stern of the boat within the frame or cradle, until the gunwales are pressed into close bracing contact with the bumpers 14. The rear end of the boat is supported during transportation by the sling with the gunwales against the buffer pads 14 as will be readily understood. In order to prevent any longitudinal movement of the boat, the bow is strapped or tied down to the loop 3. The bow of the boat being supported by the transverse plate, there can not possibly be any movement of the boat within the cradle. In the event of a smaller boat being transported, bumpers (not shown) can be used between the boat and the sides of the frame 1, to prevent rocking or lateral shifting of the same.

It is understood that suitable modifications may be made in the general design and structural details of the invention as herein disclosed and described, providing such modifications come within the spirit and scope of the appended claims. Having now therefore fully shown and described my invention, in its preferred embodiment, what I claim to be new and desire to protect by Letters Patent is:

1. A boat trailer, comprising an elongated cradle having an open bottom and rear end, a transverse bar extending across the cradle near its front end, spring suspended wheels carrying the side walls of the cradle adjacent the rear end, a transversely arched member extending up from and across the rear end of the cradle, a shaft rotatably supported by said member, operating means extending to a point adjacent the front end of the cradle for rotating the shaft, a flexible cable passing downwardly from and having its ends wound on the shaft, and means for rotating said shaft including worm and worm gear connections adapted to lock the shaft against rotation.

2. A boat trailer comprising a wheel supported frame having side parts that respectively taper forwardly from vertically spaced rear points and converge forwardly toward each other in a horizontal plane.

3. A boat trailer comprising a wheel supported frame having side parts that respectively taper forwardly from vertically spaced rear points and converge forwardly toward each other in a horizontal plane, and an arched yoke rigidly connecting and extending upwardly from rear ends of the said frame side parts.

4. A boat trailer comprising a wheel supported frame opening downwardly and rearwardly to receive a boat from that direction, said frame including side sections each having forwardly converging upper and lower rails and said sections converging inwardly to forwardly connected ends, an inverted U-shaped cross member attached to all of said rails at the rear of the frame, to rigidly connect said bars and sections, and means for releasably securing a boat in the frame.

HERBERT S. SACKETT.